Patented June 25, 1940

2,205,392

UNITED STATES PATENT OFFICE 2,205,392

(ALKYL-HALO-PHENOXY)-HALO-DIALKYL ETHERS

Gerald H. Coleman and Clarence L. Moyle, Midland, Mich., assignors to The Dow Chemical Company, Midland, Mich., a corporation of Michigan No Drawing. Application August 17, 1938, Serial No. 225,414

9 Claims. (Cl. 260—613)

This invention concerns ether compounds having the following formula

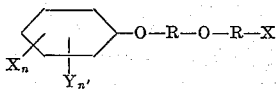

wherein each R represents an alkylene radical containing not more than 3 carbon atoms, each X represents halogen, Y represents an alkyl group containing not more than 6 carbon atoms, and $n$ and $n'$ are integers, the sum of which is not greater than 5.

The above compounds can be prepared by reacting a suitable alkyl-halo-phenol with a dihalo-lower dialkyl ether in the presence of aqueous alkali, and thereafter separating the desired ether compounds from the reaction mixture.

For example, members of the above group of compounds may be prepared by heating a mixture of beta-beta'-dichloro-diethyl ether, an alkyl-halo-phenol, sodium hydroxide, and water to a reaction temperature. Regardless of the proportions of reactants employed, a mixed product is obtained containing in addition to the desired compound a beta-beta'-di-(alkyl-halophenoxy)-diethyl ether, which is formed when both of the chlorine atoms of the beta-beta'-dichloro-diethyl ether are replaced. In order that the desired mono-chloro-ether compound be obtained in high yield, we generally react the phenol with an excess of the beta-beta'-dichloro-diethyl ether. While the reaction may be carried out at any suitable temperature, it is convenient to operate at the boiling temperature of the mixture at atmospheric pressure and under reflux. The time required for carrying out the reaction may be somewhat reduced by operating at higher temperatures and under autogenous pressure. Following completion of the reaction, the mixture is cooled and the desired ether compound separated therefrom as by extraction and fractional distillation.

The following examples describe in detail the preparation of several individual members of our new class of compounds, but are not to be construed as limiting the invention.

Example 1

A mixture of 184.5 grams (1 mol) of 2-chloro-4-tertiarybutyl-phenol, 143 grams (1 mol) of beta-beta'-dichloro-diethyl ether, 40 grams (1 mol) of sodium hydroxide, and 100 milliliters of water was heated to 107° to 110° C. for 49.5 hours. The reaction mixture was then cooled, the water-immiscible ether layer separated by decantation, washed with water, dried, and fractionally distilled, whereby there was obtained 156 grams of a high-boiling ether product. This product was refractionated to obtain beta-(2-chloro-4-tertiarybutyl-phenoxy)-beta'-chloro-diethyl ether as a water-white, viscous liquid, boiling at 166° to 170° C. at 3 millimeters pressure and having the specific gravity 1.151 at 20°/4° C.

Example 2

In a similar manner, 2 mols each of 2,4-dichloro-6-methyl-phenol and sodium hydroxide were mixed with 1.5 mols of beta-beta'-dichloro-diethyl ether and 100 milliliters of water, and the mixture heated to 109.5° C. for 16 hours under reflux. The reaction mixture was cooled and the crude ether product separated and fractionally distilled to obtain 260 grams of high-boiling ethers. Upon refractionation of this mixed product, beta-(2,4-dichloro-6-methyl-phenoxy)-beta'-chloro-diethyl ether was obtained as a viscous oil boiling at 161° to 162° C. at 3 millimeters pressure and having the specific gravity 1.299 at 20°/4° C.

Example 3

A mixture of 2 mols of 2-methyl-4-bromophenol, 4 mols of beta-beta'-dichloro-diethyl ether, and 2 mols of 20 per cent aqueous sodium hydroxide was heated to the boiling temperature and under reflux for 20 hours. The reaction mixture was then cooled and the water-immiscible layer separated by decantation. This product was washed twice with water and fractionally distilled, whereby there was obtained beta-(2-methyl-4-bromo-phenoxy)-beta'-chloro-diethyl ether as a mobile liquid boiling at 174° to 192° C. at 6 to 8 millimeters pressure and having a specific gravity of 1.432 at 25°/25° C.

Example 4

In a similar manner, 2,6-dichloro-4-tertiarybutyl-phenol was reacted with an excess of beta-beta'-dichloro-diethyl ether in the presence of an excess of aqueous sodium hydroxide to obtain beta-(2,6-dichloro-4-tertiarybutyl-phenoxy)-beta'-chloro-diethyl ether as a viscous liquid boiling at 179° to 180° C. at 4 millimeters pressure and having a specific gravity of 1.229 at 20°/4° C.

Other (alkyl-halo-phenoxy)-halo-dialkyl ethers which may be prepared by reacting the halo-alkyl-phenols with such dihalo-dialkyl ethers as beta-beta'-dibromo-diethyl ether, beta-beta'-dichloro-dipropyl ether, beta-beta'-di-iodo-diethyl ether, gamma-gamma'-dichloro-dipropyl ether, beta-chloro-gamma'-bromo-ethyl-propyl ether, beta-chloro-beta'-bromo-diethyl ether, and the like include: beta-(2,4,6-trichloro-5-methyl-phenoxy)-beta'-bromo-diethyl ether, beta-(2,4,5,6-tetrabromo-3-methyl-phenoxy)-beta'-bromo-diethyl ether, beta-(2-iodo-4-methyl-phenoxy)-beta'-chloro-diethyl ether, beta-(2,4,6-trichloro-3,5-dimethyl-phenoxy)-beta'-chloro-diethyl ether, beta-(2-chloro-4-methyl-phenoxy)-beta'-iodo-diethyl ether, beta-(2-bromo-4-normal-amyl-phenoxy)-beta'-bromo-diethyl ether, beta-(2-chloro-4-tertiaryhexyl-phenoxy)-beta'-chloro-diethyl ether, gamma-(2,4,5-trichloro-6-normal-hexyl-phenoxy)-gamma'-chloro-dipropyl ether, beta-(2-bromo-4-methyl-phenoxy)-gamma'-chloro-ethyl-propyl ether, gamma-(2-chloro-4-tertiarybutyl-6-methyl-phenoxy)-gamma'-chloro-dipropyl ether, etc.

Petroleum distillate solutions of the above ether compounds have been found of value as fly spray materials. For example, a 3 per cent solution of beta-(2-methyl-4-bromo-phenoxy)-beta'-chloro-diethyl ether in kerosene, when tested by the Peet-Grady method, substantially as described in Soap, 8, No. 4, 1932, was found to give an 88 per cent knockdown in 10 minutes and to kill 60 per cent of three-day old house flies in 48 hours. A 3 per cent solution of beta-(2,4-dichloro-6-methyl-phenoxy)-beta'-chloro-diethyl ether, when similarly tested, killed 42 per cent of the test insects in 48 hours.

We claim:

1. A compound having the formula

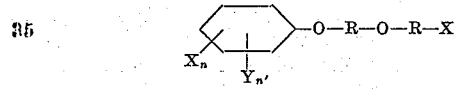

wherein each R represents an alkylene radical containing not more than 3 carbon atoms, each X represents halogen, Y represents an alkyl group containing not more than 6 carbon atoms, and $n$ and $n'$ are integers, the sum of which is not greater than 5.

2. A compound having the formula

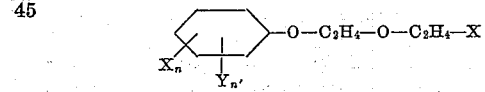

wherein each X represents halogen, Y represents an alkyl group containing not more than 6 carbon atoms, and $n$ and $n'$ are integers, the sum of which is not greater than 5.

3. A compound having the formula

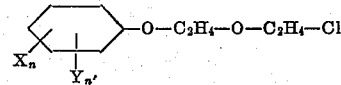

wherein X represents halogen, Y represents an alkyl group containing not more than 6 carbon atoms, and $n$ and $n'$ are integers, the sum of which is not greater than 5.

4. A compound having the formula

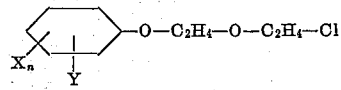

wherein X represents halogen, Y represents an alkyl group containing not more than 6 carbon atoms, and $n$ represents an integer not greater than 4.

5. A compound having the formula

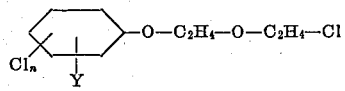

wherein Y represents an alkyl group containing not more than 6 carbon atoms, and $n$ represents an integer not greater than 4.

6. A compound having the formula

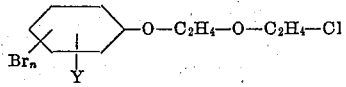

wherein Y represents an alkyl group containing not more than 6 carbon atoms, and $n$ represents an integer not greater than 4.

7. Beta-(2-methyl-4-bromo-phenoxy)-beta'-chloro-diethyl ether.

8. Beta-(2,4-dichloro-6-methyl-phenoxy)-beta'-chloro-diethyl ether.

9. A compound having the formula

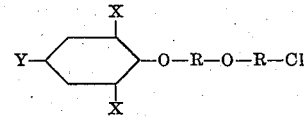

wherein each R represents an alkylene radical containing not more than 3 carbon atoms, Y represents an alkyl group containing not more than 6 carbon atoms, one X represents halogen, and the other X represents a member of the group consisting of halogen and hydrogen.

GERALD H. COLEMAN.
CLARENCE L. MOYLE.